United States Patent [19]

Santos

[11] 4,291,998

[45] Sep. 29, 1981

[54] REPLACEMENT HANDLE FOR A TOOL

[75] Inventor: Gerard R. Santos, Levittown, Pa.

[73] Assignee: The Budd Company, Troy, Mich.

[21] Appl. No.: 156,764

[22] Filed: Jun. 5, 1980

[51] Int. Cl.³ .............................................. B25G 3/24
[52] U.S. Cl. .................................. 403/263; 403/368;
16/110 R; 145/29 R
[58] Field of Search ............... 403/263, 243, 244, 368;
145/29 R, 36, 61 H, 61 R; 16/110 R

[56] References Cited

U.S. PATENT DOCUMENTS

| | | | |
|---|---|---|---|
| 2,369,790 | 2/1945 | Maxey | 403/243 |
| 3,779,296 | 12/1973 | Echeverria | 145/29 R X |
| 3,819,288 | 6/1974 | Carmien | 145/29 R UX |
| 3,874,433 | 4/1975 | Shepherd, Jr. et al. | 145/29 R |

Primary Examiner—Andrew V. Kundrat
Attorney, Agent, or Firm—A. L. Trueax, Jr.

[57] ABSTRACT

A molded plastic replacement handle for a tool, such as a sledge hammer, which includes an opening tapered from both ends so that the narrower part is located close to the center of the tool. A plastic adapter element is dimensioned to fit over one end of the handle and includes a tapered area in the same general direction as the bottom taper in the opening in the tool. After placement of the adapter element on the handle, the tool is placed on the adapter element. A metal insert having an opening therein is dimensioned to fit over to enter space between the top tapered area of the tool and the handle. The metal insert includes bottom sections disposed to bend inwardly into the space when the insert is forced downwardly to secure the tool to the top of the handle.

10 Claims, 4 Drawing Figures

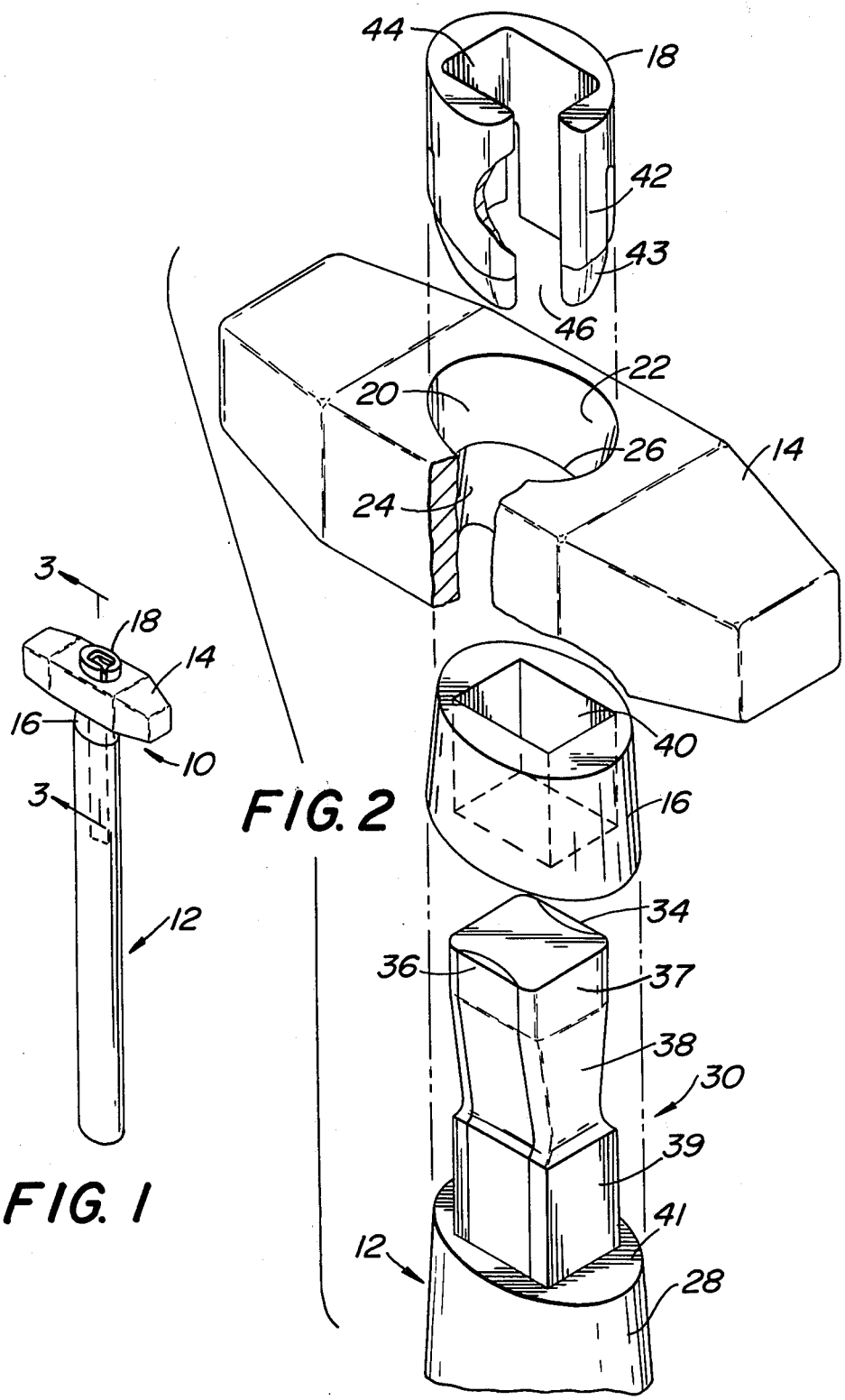

FIG. 3
FIG. 4
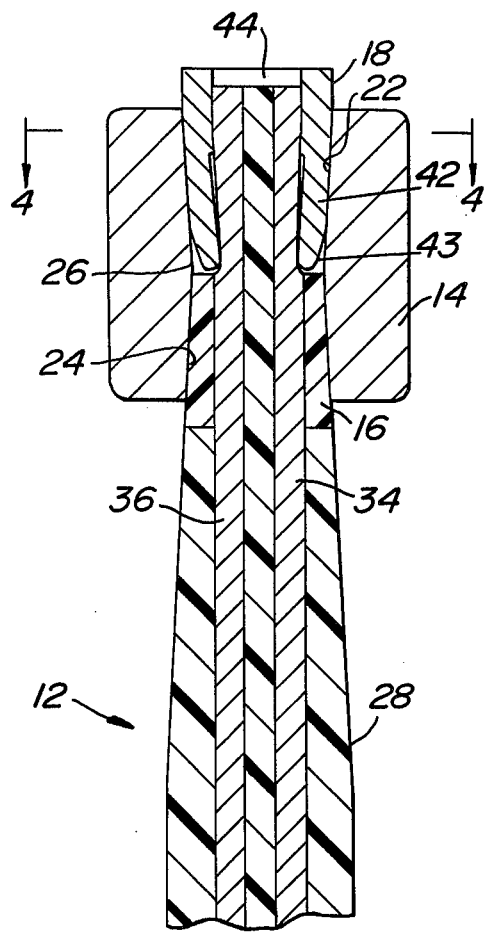
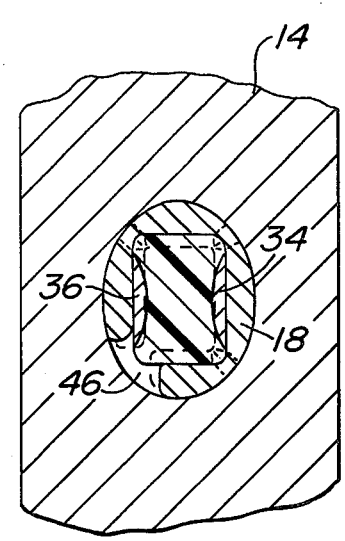

REPLACEMENT HANDLE FOR A TOOL

BACKGROUND OF THE INVENTION

Plastic handles including reinforced fiberglass have been used with tools, such as sledge hammers, axes and the like. One such handle used is made from a fiberglass pultrusion to provide strength which is surrounded by foam rubber to give an operator the feeling of a wooden handle. When such handles are used, various chemicals are employed at the factory to secure the tool to the top of the handle.

While such handles are extremely strong, they are still subject to damage and breakage during use. When it is necessary to replace a broken handle on a tool in the field, it is not only inconvenient but impractical to use the same techniques for securing a new handle to a tool as that used in the factory because of the chemicals involved and the method of assembly.

It is an object of this invention to provide an improved plastic replacement handle which may be readily installed on a tool.

It is a further object of this invention to provide a plastic handle which may be readily installed on a tool without the use of special chemicals.

It is still a further object of this invention to provide an improved method and means for securing a replacement plastic handle to a tool without the use of a special tool other than an ordinary hammer.

BRIEF SUMMARY OF THE INVENTION

A molded plastic replacement handle for a tool, such as a sledge hammer, which includes an opening therein tapering from both ends so that the narrower part is located close to the center of the tool. The handle may include one or more reinforcement strips in a main fiberglass body. An end adapter element, which may be polyurethane, is dimensioned to fit over the top end of the handle for receiving said tool. The polyurethane adapter element includes a tapered area to receive the bottom inwardly tapered portion of the tool. The top portion of the fiberglass body is machined to provide an outwardly extending tapered area smaller than the opening in said tool and tapered in the same direction as the top tapered portion of the tool. When the adapter element is in place and the tool is positioned, there is a space between the upper tapered portions of the fiberglass body and the tool. A metal insert having an opening therein is dimensioned to fit over the top tapered section of the handle into the space between the upper tapered portions of the fiberglass body and tool. The metallic insert includes bottom sections disposed to bend inwardly when the insert is forced downwardly into the space to keep the tool on the handle.

Other objects and advantages of the present invention will be apparent and suggest themselves to those skilled in the art, from a reading of the following specification and claims, taken in conjunction with the accompanying drawing, in which:

FIG. 1 is an isometric view of a tool including a replacement handle in accordance with the present invention;

FIG. 2 is an exploded view illustrating the parts of FIG. 1;

FIG. 3 is a cross-sectional view taken along lines 3—3 of FIG. 1; and

FIG. 4 is a cross-sectional view taken along lines 4—4 of FIG. 3.

DETAILED DESCRIPTION OF THE PREFERRED EMBODIMENTS

Referring to the drawings, a hammer 10 includes a plastic handle 12 secured to a tool 14. The tool 14 may be of conventional metal. The handle 12 may comprise a fiberglass pultrusion surrounded by foam rubber. The foam rubber gives the operator the feeling of a wooden handle. The pultrusion method of forming the handle 12 provides a fiberglass structure which is extremely strong. The top of the handle 12 includes an adapter element 16 which may be made of polyurethane material, for example. The metal insert 18 is driven between the tool 14 and the top portion of the handle, as will be described in detail.

The pultrusion process is well known to those skilled in the art. In this process, the fibers are drawn through a hardenable liquid resinous bath, through a shaping die and appropriate heating and curing oven. Many shaped members in the form of rods, bars and the like have been made commercially by the pultrusion process. The process, for example, is described briefly in column 2, lines 36–47 of a patent to Johnson U.S. Pat. No. 3,868,141 issued Feb. 25, 1975. Also "MODERN PLASTICS Encyclopedia Issue for 1964" (dated September, 1963) includes a discussion of pultrusion on pages 577 and 578.

In considering the present invention, it will be considered that the handle 12 is being used as a replacement handle in the field, although it is apparent that the tool itself may be assembled and manufactured in the manner illustrated before leaving the factory. Referring to FIG. 2, the tool 14 includes an opening 20. The eye of the tool includes the top tapered surface 22 and a bottom tapered surface 24 tapered inwardly to form a narrow part at their points 26. The narrowest part is generally disposed at the center of the tool. The tapered portions 22 and 24 are found in most conventional tools.

The plastic handle 12 includes the foam rubber exterior surface 28 and the main fiberglass portion 30. The foam rubber extends wider than the top portion of the handle 12 and provides a shoulder 41 on which the adapter element 16 will rest when the hammer is assembled. The foam rubber material tends to form an outer skin when it is molded in a metal mold such as aluminum. The fiberglass portion or pultrusion 30 may include a pair of metal or fiberglass strips 34 and 36 which extend into the cavities formed when the main fiberglass handle is formed by the pultrusion method. These strips may extend downwardly into the handle for approximately 8 inches. The strips provide additional reinforcement in the area where the greatest stresses are applied to the tool. The top portion of the fiberglass also includes a top rectangular surface 37 disposed above an outwardly extending tapered portion 38. The tapered portion 38 is machined into the handle 12. The taper 38 extends in the same general direction as the upper taper 22 in the tool 14.

The adapter element 16 comprises a polyurethane body shaped to fit over the top end of the handle 12. The polyurethane adapter element 16 includes a rectangular opening 40 therein to receive a rectangularly shaped portion 39 disposed below the top portion 38 therethrough when the adapter element 16 is inserted over the handle 12. The top portion 38 will protrude beyond the adapter element 16 after it has been installed.

After the adapter element 16 has been inserted over the handle 12, the tool 14 is inserted over it. The adapter element 16 is dimensioned so as to fill the bottom half area of the opening 20 of the tool 14. Under these conditions, the area 38 of the fiberglass portion of the handle 30 extends upwardly beyond the top of the tool 14. The portion 37 is smaller than the narrowest portion of the opening 20 to readily fit therethrough and to extend beyond the top of the tool. The portion 37 is tapered in the same direction as the top taper 22 of the tool. The metal insert 18 is now ready to be installed to hold the tool 14 in place on the handle 12.

When the tool 14 is in place over the handle 12, a space is provided between the surface 22 and the tapered surface 38. The purpose of this space is to receive the metal insert 18 therein. The dimension of the metal insert 18 must be such so as to fit into the space between the two tapered parallel surfaces. The metal insert 18, placed in the space between the tapered surfaces, may be driven down by a hammer or other conventional means.

The metal insert 18 includes lower sections or prongs 42, which include narrow portions 43. These sections are formed by cutting into the bottom portion of the metal insert 18. Additionally, there is an opening in the metal insert 18 to permit a certain amount of flexibility of the metal insert as it is being installed. The metal insert includes a central opening 44 and the cut-away portion 46.

As the metal insert 18 is driven down into the space between the tapered surfaces 22 and 38, the prongs or sections 42 are bent inwardly to conform with the tapered surface 38. This is illustrated in FIG. 3. In some cases, it may not be necessary to extend the metal insert 18 completely into the space so that a small amount of insert may be disposed above the top of the tool. As indicated in FIG. 3, the bottom sections 42 are tapered inwardly or narrowed at portions 43. This permits easier insertion of the insert 18 and also facilitates the bending of the bottom sections 42 after insertion into the tool.

Thus it is seen that the adapter element portion 16 fills approximately half the tool area in its opening and is designed so that it can fit various tool sizes and imperfections. The remaining part of the opening in the tool is filled with the metal insert 18. The top tapered surface 22 in the tool and the tapered surface 38 on the fiberglass material are parallel with each other and extend in the same direction to provide the space to receive the metal insert. Insertion of the tongues or sections of the metal insert at the top facilitated by the narrow portions 43, causes the material to bend resulting in securing the insert in the cavity or opening. This provides a very strong self locking action making it extremely difficult to remove the tool from the handle.

In some cases, the narrowed sections 43 on the prongs 42 of the insert 18 will bend inwardly towards the tapered surface 38 even when the tapered portions in the opening in the tool are not present. While it is believed that the present invention may not be as effective with tools with straight openings, the degree of securing of the tool to the handle may be acceptable in some cases.

It is seen that the present invention has provided a relatively simple means to insert a plastic handle onto a tool in the field. No special chemicals are required and the tool may be inserted onto the handle by use of the metal insert with a simple hammer or other available tools.

What is claimed is:

1. A handle for a tool having an opening therein with top and bottom inwardly extending tapered portions from both ends so that the narrower part is located close to the center of the tool,
    said handle comprising:
    (a) a plastic strip;
    (b) said plastic strip including a top tapered portion adjacent one end having a tapered direction corresponding to the taper direction of the top tapered portion in said tool;
    (c) said top tapered section of said strip being spaced from the top tapered portion of said tool;
    (d) an adapter element disposed to slide over the top of said handle around said top section of said strip,
    (e) said adapter element including a tapered area to receive the bottom tapered portion of said tool;
    (f) a metal insert having an opening therein dimensioned to fit over said top section of said strip in the space between the top tapered section of said strip and the top tapered portion of said tool; and
    (g) said metal insert including bottom sections disposed to bend inwardly when said metallic insert is forced downwardly into said space to secure said tool to said handle.

2. A handle as set forth in claim 1 wherein said plastic strip comprises a reinforced fiberglass material.

3. A handle as set forth in claim 2 wherein said strip of said handle is surrounded by a plastic foam material substantially along its length, with one end of said strip including said top tapered section being free of said plastic foam material.

4. A handle as set forth in claim 3 wherein said plastic foam material towards the top tapered section of said strip is wider than said strip and provides a shoulder to receive said adapter element thereon.

5. A handle as set forth in claim 4 wherein said adapter element includes a rectangular opening and said strip includes a bottom rectangular shaped section disposed below the tapered section of said strip to fit through the opening of said adapter element whereby said adapter element is disposed to be placed over the top of said handle around the bottom rectangular section of said strip to rest on the shoulder provided by said plastic foam material.

6. A handle as set forth in claim 5 wherein said metal insert includes a rectangular opening and said strip includes a top rectangular section disposed above said tapered section, said rectangular opening in said insert disposed to fit around the top rectangular section during the assembly of the handle with the tool.

7. A handle as set forth in claim 6 wherein one or more reinforcement elements are provided in said strip, said reinforcement elements extending from the top end of said strip, through the tool opening and partly into the handle surrounded by said plastic foam material.

8. A handle as set forth in claim 7 wherein said strip comprises a pultrusion including reinforced strands of fiberglass.

9. A handle as set forth in claim 8 wherein said plastic foam material comprises urethane foam formed with an exterior skin.

10. A handle as set forth in claim 9 wherein said material of said adapter element is urethane.

* * * * *